United States Patent [19]

Schultz

[11] Patent Number: 5,083,457
[45] Date of Patent: Jan. 28, 1992

[54] REMOTELY ACTUATED TIRE PRESSURE SENSOR

[75] Inventor: Thomas J. Schultz, Neenah, Wis.

[73] Assignee: TJS Development Corporation, Inc., Neenah, Wis.

[21] Appl. No.: 453,785

[22] Filed: Dec. 20, 1989

[51] Int. Cl.⁵ .............................................. B60C 73/02
[52] U.S. Cl. ................................. 73/146.5; 73/146.8; 340/445; 364/558
[58] Field of Search .................... 73/146.5, 146.8; 364/558; 340/445, 447, 443, 442

[56] References Cited

U.S. PATENT DOCUMENTS

| | | | |
|---|---|---|---|
| 3,592,218 | 7/1971 | Guy | 137/227 |
| 3,827,393 | 8/1974 | Winther | 116/34 |
| 4,067,235 | 1/1978 | Markland et al. | 73/146.5 |
| 4,250,759 | 2/1981 | Vago et al. | 73/723 |
| 4,704,901 | 11/1987 | Rocco et al. | 73/146 |
| 4,891,973 | 1/1990 | Bollweber et al. | 73/146.5 |
| 4,909,074 | 3/1990 | Gerresheim et al. | 73/146.5 |

Primary Examiner—Donald O. Woodiel
Attorney, Agent, or Firm—Foley & Lardner

[57] ABSTRACT

A tire pressure sensor is provided including a transducer unit having a mechanical-to-electrical transducer disposed in intimate contact with the pressurized region of a tire. The transducer senses tire pressure and outputs an electrical signal representative thereof. The transducer unit further includes a response signal generator which transmits a signal representative of tire pressure. A hand-held remote display unit receives the transmitted signal and converts it to visual indicia of tire pressure, for example on a three-digit digital display.

10 Claims, 7 Drawing Sheets

REMOTELY ACTUATED TIRE PRESSURE SENSOR

TECHNICAL FIELD

The present invention relates, generally, to a transmitter and receiver combination for measuring the pressure within a vehicle tire, and more particularly, to a transmitter including a pressure transducer and an infrared generator cooperating therewith, for transmitting an infrared signal indicative of pressure to a hand-held remote receiver unit including a pressure display.

BACKGROUND OF THE INVENTION

The leading cause of premature tire failure is improperly fitted tires. Underinflated or overinflated tires can result in vehicle damage, inadequate traction, low gas mileage, premature tread wear, and blowouts, i.e., spontaneous destruction of the tire.

Presently known devices for determining tire pressure are unsatisfactory in several regards. For example, existing techniques for measuring tire pressure typically involve coupling a mechanical pressure sensor to the valve stem and reading a lineal gauge extending from the sensor. See, for example, Guy U.S. Pat. No. 3,592,218, issued July 13, 1971. This procedure is time consuming, cumbersome, and wholly unsuited for use in inclement weather, especially when the vehicle may have up to eighteen or more wheels.

Tire pressure sensors configured to be mounted directly to the tire valve stem are also known. See, for example, Winther U.S. Pat. No. 3,827,393, issued Aug. 6, 1974. The Winther device comprises a pressure differential sensor disposed within a cylindrical housing, which housing is threadedly attached to the valve stem. When the tire is properly inflated, the pressure at the differential pressure sensor valve is sufficient to overcome a spring force which acts on the valve seat. When the pressure within the tire drops below a predetermined threshold, the differential pressure sensor valve moves in the spring biased direction, porting tire pressure to a slideable piston assembly having a visibly conspicuous piston rod disposed to project axially from the valve assembly at low tire pressures.

Another known device involves a cap designed to replace existing standard valve stem caps. The color exhibited by the cap changes with a decrease in tire pressure, thus providing visual indicia of tire pressure loss.

Yet another known tire pressure sensing device produces a digital LCD readout indicative of tire pressure when the hand-held sensor is brought into engagement with the valve stem. Such a device is available from Leichtuug Workshops of Cleveland, Ohio, catalog No. 93153.

The foregoing devices are unsatisfactory in several regards. For example, in many of the devices, the operator must remove the valve stem cap, engage the pressure sensor with the valve stem, observe a reading, and thereafter replace the valve stem cap. This procedure must then be repeated for each tire. Other of the foregoing devices are designed to replace the existing valve stem cap, so that the pressure sensing device need only be removed when it is necessary to inflate the tire. These latter devices, however, do not indicate the magnitude of the pressure level in the tire; rather, they merely indicate whether the pressure is above or below a predetermined threshold. Further, many prior art devices rely on visual indicia at or physical connections to the tire stem, which is often neither readily visible nor accessible, e.g., the interior tires of coaxial sets of tires on 18 wheel trucks.

A tire pressure sensing device is needed which overcomes the shortcomings of the prior art.

SUMMARY OF THE INVENTION

The present invention provides a tire pressure sensor including a transducer unit and a remote display unit. The transducer unit includes a mechanical-to-electrical transducer disposed to sense the internal tire pressure. The transducer generates an electric signal representative of the magnitude of the tire pressure and applies this signal to an LED driver. The LED driver modulates one or more LEDs, which directionally transmits an infrared (IR) signal to the hand-held display unit.

The modulated IR signal is received by the display unit and applied to a processor. In response, the processor drives a digital display, which produces visual indicia of the tire pressure.

BRIEF DESCRIPTION OF THE DRAWING

Preferred exemplary embodiments of the tire pressure sensor in accordance with the present invention will hereinafter be described in conjunction with the appended drawing, wherein like designations denote like elements, and.

DETAILED DESCRIPTION OF PREFERRED EXEMPLARY EMBODIMENTS

Figure 1:
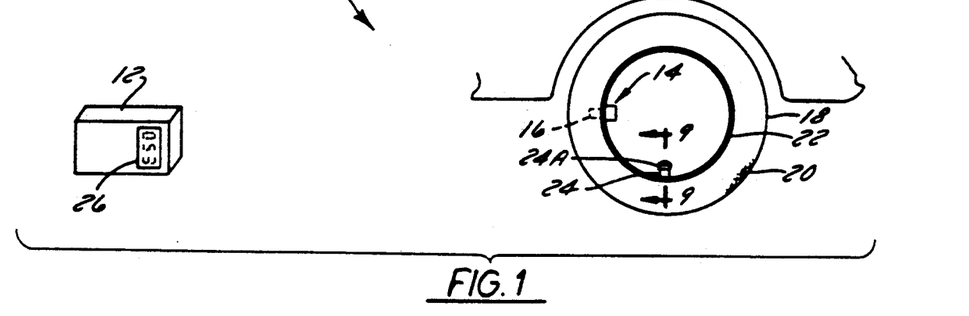
FIG. 1 is a schematic representation of a remote display unit and a transmitter unit, including a transducer, mounted on a conventional vehicle tire.

Referring now to FIG. 1, a tire pressure sensor system 10 in accordance with the present invention suitably comprises a display unit 12 and a transducer unit 14 having a pressure transducer 16 in intimate contact with a tire 18. Pressure transducer 16 is illustratively disposed within the pressurized chamber of tire 18, between a tread portion 20 and a rim 22 of tire 18. Those skilled in the art will appreciate, however, that transducer 16 may assume any suitable disposition which allows it to sense the internal tire pressure. For example, as discussed in greater detail below, transducer 16 may be mounted within the valve 24 of tire 18, either in the stem or cap portion of the valve. Alternatively, transducer 16 may be mounted to, embedded within or extend from the sidewall portion of the tire, tread 20, or rim 22.

Pressure transducer 16 is configured to convert tire pressure into an electrical signal representative of tire pressure, for subsequent transmission to display unit 12. In response to a pressure transmission, display unit 12 produces visual indicia, such as, for example, a digital readout 26, representative of tire pressure.

Figure 2A:
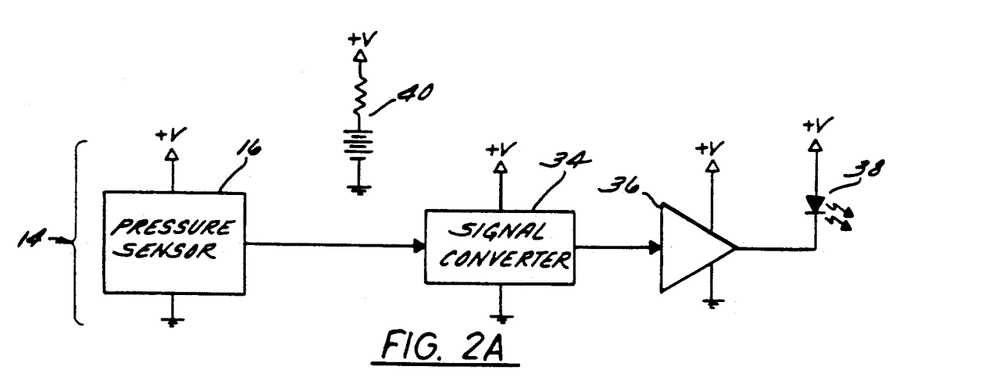
FIGS. 2A and 2B are schematic block diagrams of a preferred embodiment of the tire pressure sensor system in accordance with the present invention.

Referring now to FIG. 2A, transducer unit 14 suitably includes a suitable pressure sensor (transducer 16), a suitable signal converter 34, a light emitting diode (LED) drive 36 and an LED 38.

Pressure sensor 16 is advantageously configured to sense tire pressure, generate an electrical signal indicative of the sensed pressure, and apply the signal to signal converter 34. Signal converter 34 then converts the pressure signal into an encoded form suitable for use as a modulating signal for LED 38, i.e., LED 38 is modulated in a manner which represents the sensed pressure as a selected characteristic of the encoded signal, e.g., frequency, pulse code, pulse width, etc. Signal converter 34 comprises a suitable encoder, such as, for example, a voltage-to-frequency converter, an analog-to-digital converter, a voltage-to-pulse width converter, or the like, and supporting circuitry.

The encoded signal indicative of tire pressure produced by signal converter 34 is applied to LED driver 36. The output of LED driver 36 drives an LED 38, which emits a modulated response signal, suitably in the infrared frequency range, indicative of tire pressure. The LED emissions are preferably directional, so that the hand-held display unit can discriminate between individual tires, even where the tires are in close proximity to each other. The foregoing components associated with schematic transducer circuit 14 are suitably powered by a battery circuit 40 disposed within the transducer unit. A specific embodiment of transducer unit 16 will hereinafter be described in more detail in conjunction with FIG. 5.

Figure 2B:
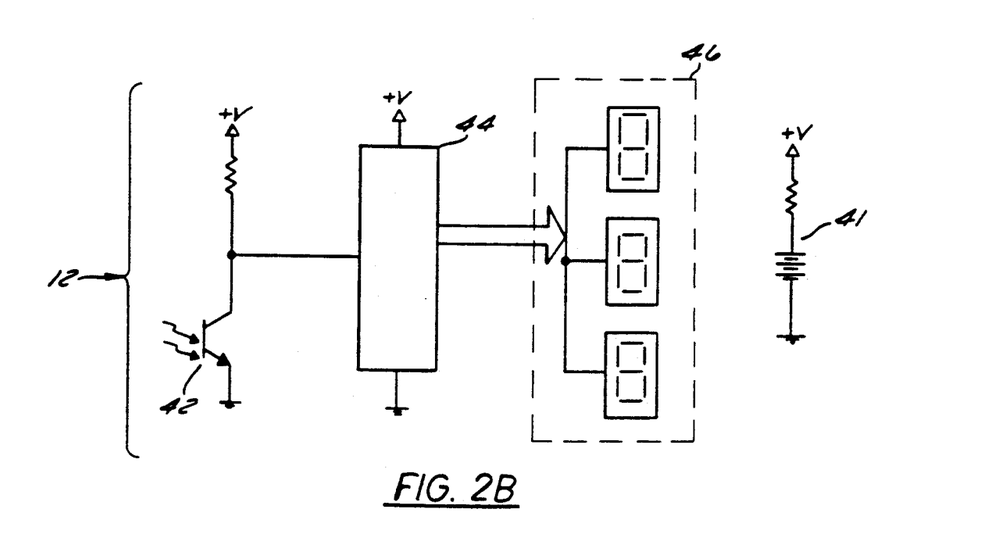

Referring now to FIG. 2B, display unit 12 suitably comprises: a battery circuit 41; an appropriate sensor 42, e.g. an IR sensor; a processor 44; and a conventional display 46. The modulated signal transmitted by LED 38 is received at display unit 12 by sensor 42. The voltage from battery 41 is applied to sensor 42, and is modulated in accordance with the response signal received from transducer circuit 14. The modulated signal is applied to a processor 44, wherein information is extracted from the signal and manipulated into a form suitable for application to display 46. Display 46 generates visual indicia, for example a digital readout, representative of tire pressure. A specific embodiment of display unit 12 will hereinafter be described in more detail in conjunction with FIGS. 3A, 3B and 4.

As discussed in greater detail below, the functions performed by the various elements comprising the foregoing schematic circuit diagrams may be implemented in a variety of ways. For example, the functions performed by the pressure sensor circuit ma be embodied in a unitary microchip (integrated circuit) for convenient disposition within the valve stem or valve stem cap of a vehicle tire. The functional elements comprising the display unit may similarly be implemented in a microchip or microprocessor, and incorporated into a hand-held remote control display device.

Referring now to FIGS. 3A-5, an embodiment of tire pressure sensing system 10 employing frequency modulation for encoding will be described.

Figure 3A:
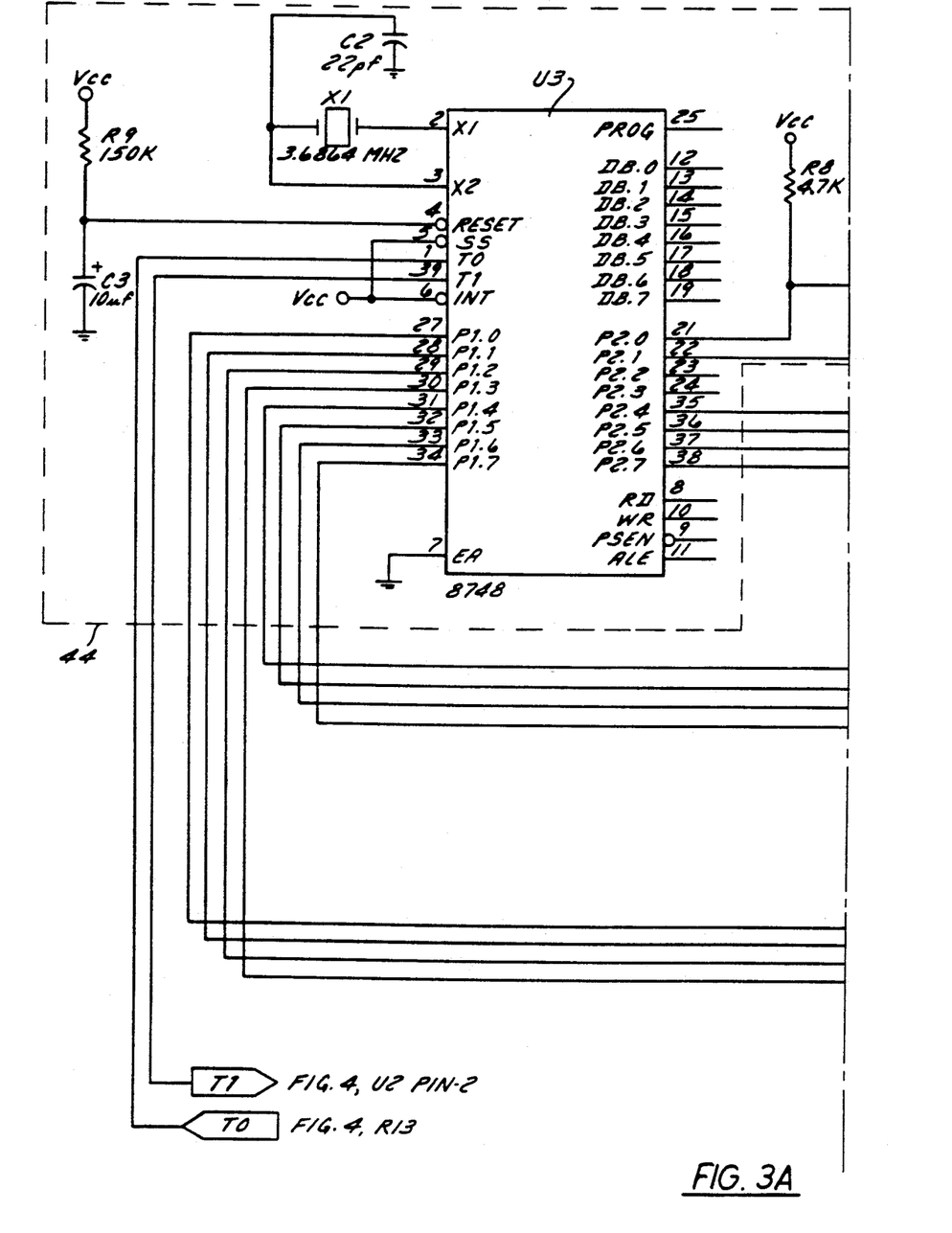
FIGS. 3A, 3B and 4 are an electrical schematic circuit diagram of an alternate preferred embodiment of the display unit in accordance with one aspect of the present invention.
Figure 3B:
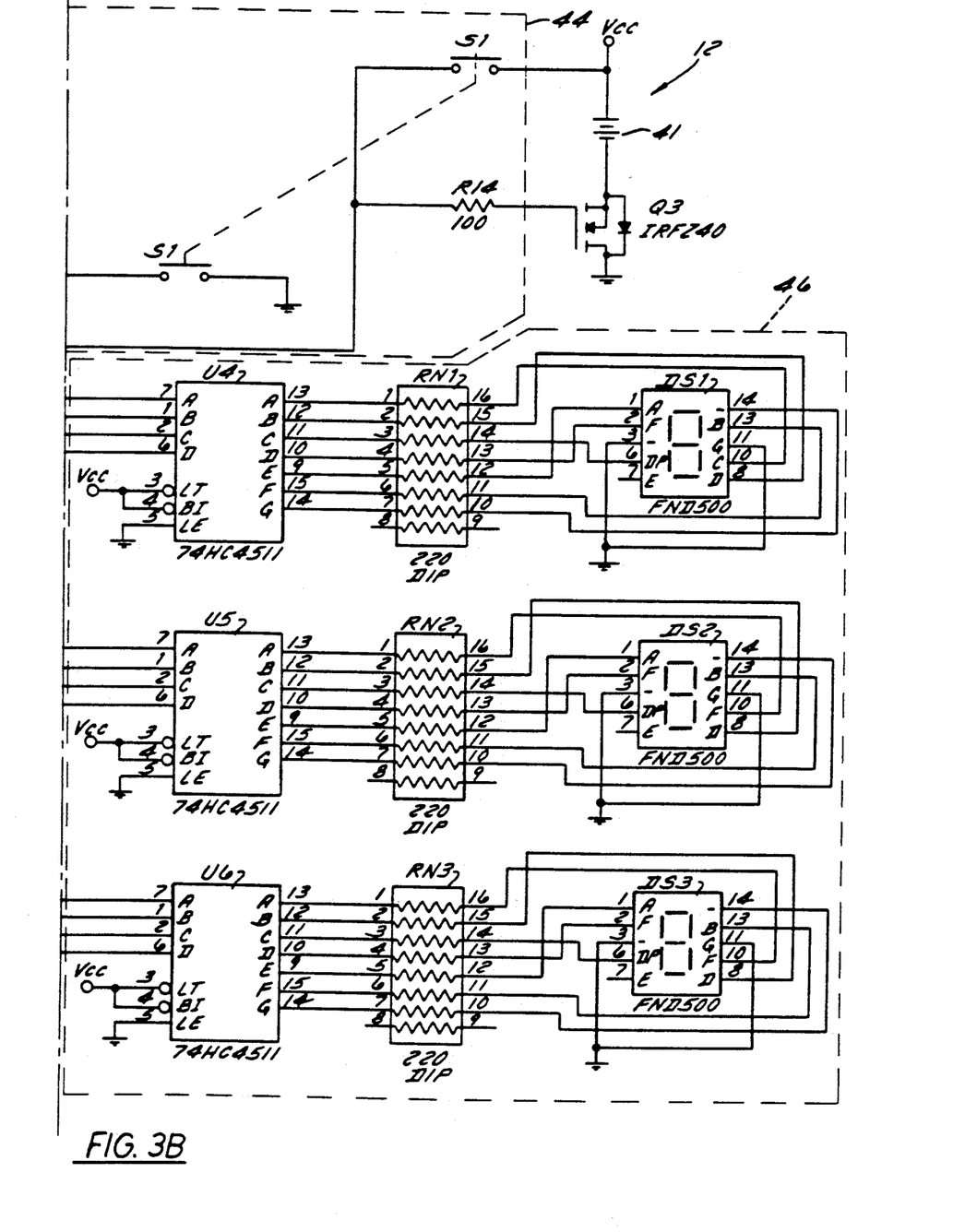
Figure 4:
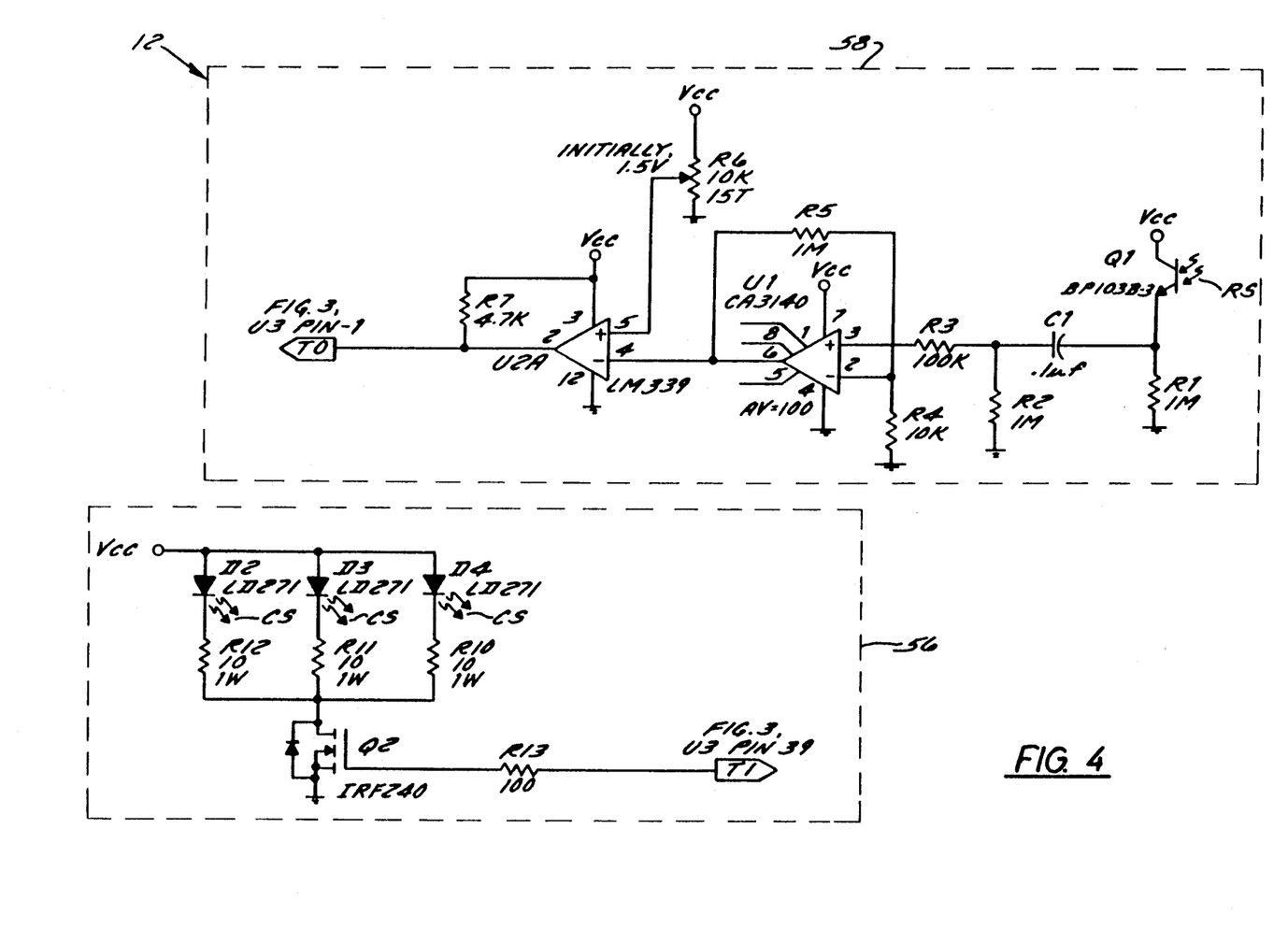

With specific reference to FIGS. 3A, 3B and 4, processor 44 of display unit 12 suitably comprises a switch S1, a processor U3 including a clock X1, a command generator circuit 56, and an amplifier circuit 58. Display 46 suitably comprises three conventional seven segment displays DS1, DS2, and DS3, and associated drivers.

To conserve power, display unit 12 remains in a "dormant" state until "powered up" by the operator, as described below. In the dormant state, i.e., when switch S1 is open, pins 21 and 22 of processor U3 terminate at an open circuit. When it is desired to determine the tire pressure, the operator depresses switch S1 to power up display unit 12.

More particularly, battery 41 cooperates with switch S1, a resistor R14, and a transistor Q3, (e.g., an IRFZ40 field effect transistor manufactured by the Motorola Semiconductor Company). With switch S1 open, no current flows through resistor R14. When S1 is closed, current is applied to the base of transistor Q3 through resistor R14, thereby turning on transistor Q3 and allowing the output from battery 41 to be applied to pin 22 of processor U3. Each time switch S1 is depressed, software resident in processor U3 initiates an active cycle having a predetermined duration, e.g. ten seconds, during which pin 22 is maintained at a high logic state. Closure of switch S1 also drives pin 21 of processor U3 to a low logic state (illustratively to ground).

Processor U3 suitably comprises an HMOS-E single component 8-bit microcomputer, for example a Model 8748H manufactured by Intel. The timing for processor U3 is suitably provided at pins 2 and 3 thereof by clock X1, suitably comprising a 3.6864 MHz crystal.

In the powered-up condition, i.e., when switch S1 is closed, processor U3 generates a command reference signal at output terminal T1 (pin 39). The command reference signal suitably corresponds to a tone of predetermined frequency The command reference signal is applied to a lead T1 of command generator 56 (FIG. 4), thereby turning a transistor Q2 on and off in accordance with the frequency of the command reference signal. Transistor Q2 is advantageously similar to transistor Q3, described above.

In response to the application of the pulsed command reference signal to the base of transistor Q2, VCC is applied across respective LEDs D2, D3 and D4. Respective LEDs D2-D4 suitably comprise respective IR emitters, Model No. LD271, manufactured by Seimens-Litronix. Thus, respective LEDs D2-D4, under the control of processor U3, generate emissions modulated with a predetermined frequency (tone). As described in greater detail below, the frequency modulated infrared signal transmitted by command generator 56 comprises a "wake-up" command signal CS used to activate transducer unit 14. Also as described in greater detail below, transducer unit 14 responsively transmits an infrared signal, indicative of tire pressure, back to display unit 12.

With continued reference to FIG. 4, a response signal RS generated by transducer unit 14 is received by display unit 12 at amplifier circuit 58. More particularly, response signal RS is sensed by a photo-sensitive transistor Q1. Transistor Q1 is suitably a photo-transistor, Model No. BP103B-3, manufactured by Seimens-Litronix. Upon application of response signal RS to the base of transistor Q1, transistor Q1 generates a signal at the emitter thereof indicative of response signal RS, and hence, indicative of the encoded sensed pressure. The received signal is applied to a filter comprising a capacitor C1 and a resistor R2. The filtered signal is then applied to pin 3 of an amplifier U1, e.g., a BiMOS operational amplifier CA3140 integrated circuit, with a gain of 100. The amplified signal representative of tire pressure is applied to pin 4 of a comparator U2A.

Comparator U2A is suitably a low power, low offset voltage comparator, e.g., a Model No. LM339 manufactured by National Semiconductor. Comparator U2A advantageously cooperates with a variable resistor R6 to adjust the sensitivity of amplifier circuit 58. Specifically, the resistance of R6 may be selected such that a desired voltage level is maintained at pin 5 of comparator U2A. In this way, only those voltage levels present at pin 4 of comparator U2A which are above a predetermined threshold level are passed through the comparator.

Comparator U2A applies an output signal to a lead T0 connected to pin 1 of processor U3 (FIG. 3A). Processor U3 converts the signal received at pin 1 thereof into respective first, second, and third parallel binary signals for subsequent application to display 46.

More particularly, processor U3 outputs a first 4-bit binary signal at pins 35-38 thereof, which first 4-bit binary signal is applied to respective pins 1, 2, 6, and 7 of a first display driver U4 in display 46. Driver U4 suitably comprises a BCD-to-7-segment latch/decoder, for example Model No. MC54/74HC4511 manufactured by Motorola. In response to the application of the first binary signal, driver U4 applies a first output signal, through a resistive network RN1, to a first display DS1. Display DS1 suitably comprises a 7-segment display, for example Model No. FND500 manufactured by Fairchild Semiconductor.

Similarly, processor U3 applies second and third 4-bit binary signals to display drivers D5 and D6 which, in turn, drive display DS2 and DS3, respectively. Displays DS1, DS2, and DS3 cooperate to produce a 1, 2, or 3 digit numeric display indicative of the tire pressure sensed by transducer unit 14.

Figure 5:
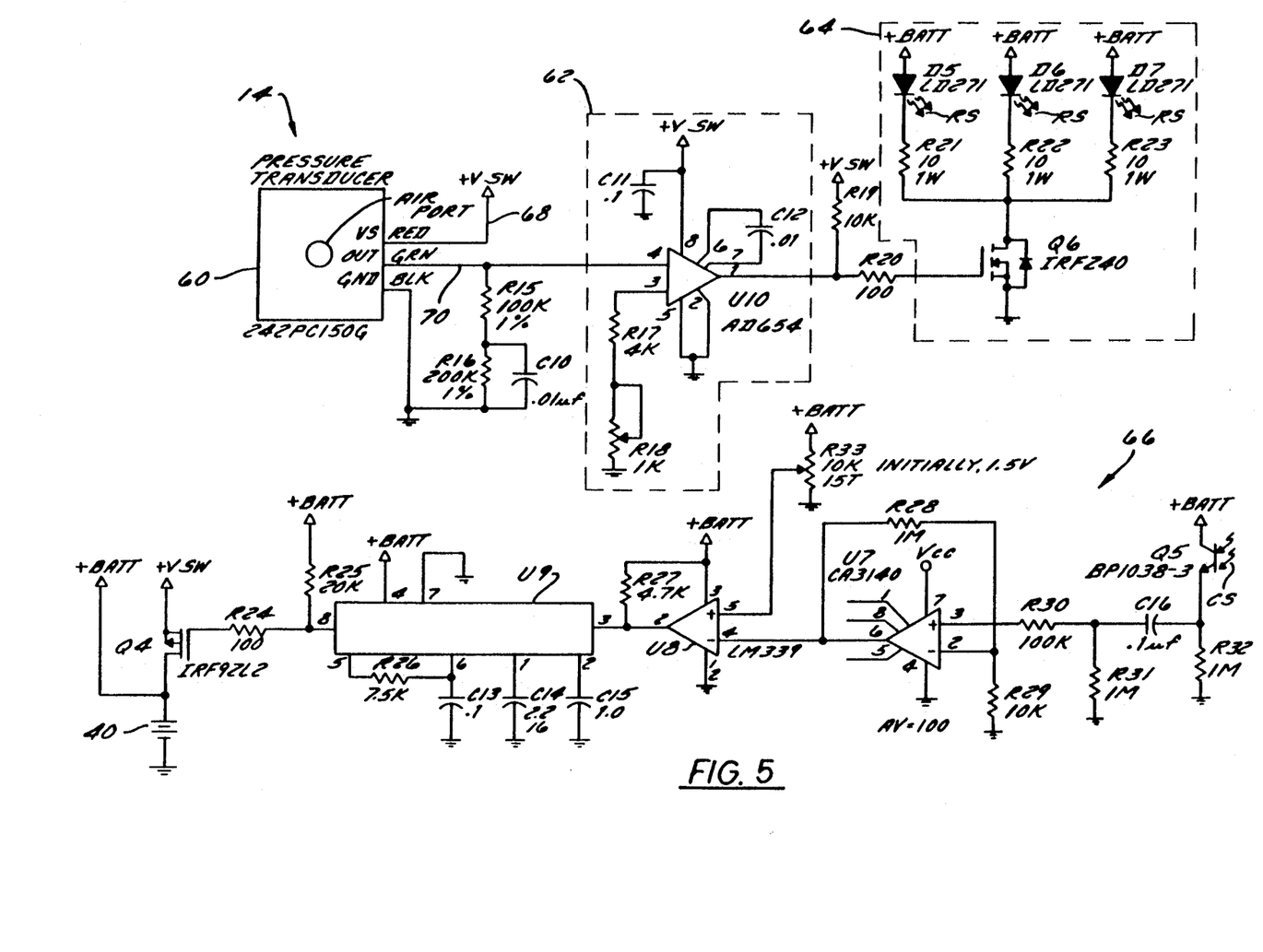
FIG. 5 is an electric schematic circuit diagram of an alternate preferred embodiment of a transducer unit in accordance with one aspect of the present invention.

Referring now to FIG. 5, transducer unit 14 suitably comprises a pressure transducer 60, a voltage-to-frequency converter 62, an IR sender 64, and a power circuit 66.

Figure 9:
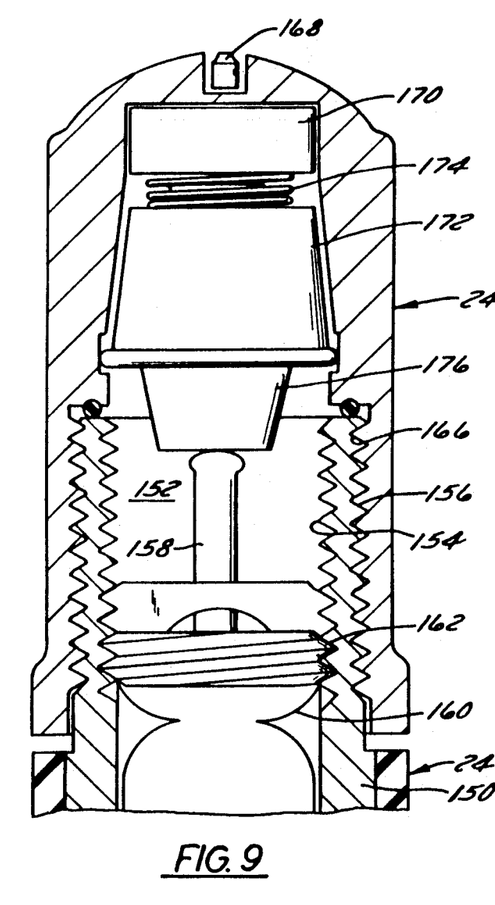
FIG. 9 is a cross-section view, taken along line 9—9 in FIG. 1, of a tire valve stem and valve stem cap in accordance with an alternate preferred embodiment of the present invention.

In a preferred embodiment of the present invention, transducer unit 14 is configured for disposition within a modified valve stem cap for use in conjunction with conventional vehicle tire valve stems (see FIG. 9). In this manner, a low cost pressure sensor circuit may be powered by a battery which, upon depletion of power, may be discarded. Nonetheless, it is desirable to construct the transducer circuit such that a minimum amount of power is consumed. Transducer unit 14 therefore preferably operates in alternative "dormant" and "active" states. The active state is triggered by reception of command signal CS from display unit 12.

Power circuit 66 controllably provides power to the respective components of transducer unit 12, in accordance with the operational state. Respective parallel voltage outputs +BATT and +V SW are provided: +BATT, a low level, constant voltage output for supplying operating power to the various components comprising transducer unit 14; and +V SW, selectively provided through a transistor Q4, to pressure transducer 60, converter 62, and IR sender 64. Transistor Q4 is turned on only upon receipt of command signal CS by power circuit 66 from command generator 56 (FIG. 4). Accordingly, transducer unit 14 consumes a minimal amount of battery power when transistor Q4 is off.

Command signal CS is received at a photo-sensitive transistor Q5 in power circuit 66. Upon reception of command signal CS at the base of transistor Q5, a signal indicative of command signal CS is generated at the emitter of transistor Q5. The received signal is filtered (by a capacitor C16 and a resistor R31) and applied to an amplifier U7, suitably with a gain of 100 and equivalent to amplifier U1.

The output of amplifier U7 is applied to a comparator U8, suitably equivalent to comparator U2A. Comparator U8 cooperates with a variable resistance resistor R33 in a manner similar to that described in connection with amplifier circuit 58 (FIG. 4). In this way, the sensitivity of power circuit 66 may be adjusted so that +V SW is applied to transducer 60 only upon the receipt by transistor Q5 of command signals which exceed a predetermined level determined by resistor 33.

The output of comparator U8 is applied to a tone decoder U9, for example a Model No. LM567 decoder manufactured by National Semiconducter. Tone decoder U9 functions as a simple decoder, producing an output at pin 8 thereof having a high logic state only when the appropriate "tone" is received by transistor Q5. Tone decoder U9 thus functions as a band width discriminator, rejecting input signals having band widths outside the range defined by the foregoing components and producing a high logic output in response to a tone within a predetermined band width.

Pin 8 of decoder U9 is applied to the base of transistor Q4. When a high logic state signal is produced at pin 8 of tone decoder U9, transistor Q4 is turned on, making +V SW available.

Power circuit 66 thus maintains transducer circuit 14 in a dormant state notwithstanding the receipt by photo-sensitive transistor Q5 of spurious input signals outside the predetermined band width from, for example, sunlight, headlights, and the like.

Transducer 60 suitably comprises an electromechanical transducer capable of generating a low level voltage output, for example between 0 and 10 volts, in response to the application of pressures in the range typically exhibited by vehicle tires, i.e., up 150 psi. Piezoelectric materials are known to be excellent transducers. Although it is desirable to miniaturize the pressure sensing circuit in the preferred embodiment, a pressure sensor Model No. 240PC manufactured by Microswitch has yielded satisfactory results in the laboratory. Those skilled in the art will appreciate that transducer 60 may comprise a suitable microsensor.

Voltage-to-frequency converter 62 suitably comprises a converter U10, for example, a voltage-to-frequency (VF) converter Model No. AD654 manufactured by Analog Devices. With +V SW applied to lead 68 of pressure transducer 60, an output signal is produced at lead 70 and applied to pin 4 of VF converter U10. In response, VF converter U10 produces an output at pin 1 thereof having a frequency which is proportional to tire pressure.

Voltage-to-frequency converter 62 further suitably includes a variable resistance resistor R18 disposed in operative association with convertor U10. Together, VF converter U10 and variable resistance resistor R18 cooperate to calibrate the output at pin 1 of conversion circuit 62 with respect to pressure transducer 60.

More particularly, the resistance of resistor R18 may be selected such that the output at pin 1 of VF converter U10 is zero when transducer 60 is exposed to ambient pressure.

Converter 62 thus generates a signal having a frequency indicative of pressure, ranging from 0 Hz at atmospheric pressure to a predetermined maximum frequency at an anticipated maximum pressure.

The output of converter 62 is applied across a resistor R20 to an output (driver) transistor Q6, which may be equivalent to transistor Q2, described above. The frequency of the signal applied to the base of transistor Q6 represents the modulation frequency of response signal RS generated by IR sender 64.

IR sender 64 illustratively comprises a plurality of LEDs D5, D6, and D7, which may be equivalent to LEDs D2-D4 discussed above in connection with command generator circuit 56. More particularly, LEDs D5-D7, in respective series connections with resistors R21-R23, are disposed in parallel, between +BATT from battery 40 and transistor Q6. Upon the application of a signal from converter 62 to the base of transistor Q6, a current path through each of LEDs D5-D7 is completed, through transistor Q6 to ground. The frequency of the signal applied at pin 1 of VF converter U10 represents the modulation frequency of response signal RS generated by respective LEDs D5-D7.

As previously mentioned, response signal RS generated by IR sender 64 is received by amplifier circuit 58 (FIG. 4) of display unit 12, and is processed to derive pressure information for subsequent display.

The operation of the preferred exemplary embodiment shown in FIGS. 3A-5 will be described with reference to FIGS. 6-8.

Software resident in processor U3 governs the operation of tire pressure sensor apparatus 10. Upon the application of VCC to pin 22 of processor U3, a series of initializing functions are performed (step 102). For example, a high logic input state is maintained at pin 22 for a predetermined cycle time, e.g. ten seconds, regardless of the length of time switch S1 is actually depressed by the operator. In contrast, a low logic state is present at pin 21 only while switch S1 is depressed.

An additional initializing function involves driving respective displays DS1-DS3 of display circuit 46 to a blank condition (step 102). That is, display circuit 54 may display, for example, three zeros, three eights (either constant or flashing) or, alternatively, the display may be literally blank with none of the segments comprising the displays illuminated. Conventional BCD-to-7-Segment logic may be may be advantageously employed in the control of display circuit 54.

A further initializing function involves setting up an internal counter to generate the command reference signal at pin 39 of processor U3 (step 102), although pin 39 is not enabled until step 110, discussed below. In a particularly preferred embodiment, the tone associated with command signal CS corresponds to a frequency of 1209 hz. As discussed above in connection with FIGS. 3A, 3B and 4, the command reference signal effects the generation of command signal CS at respective LEDs D2-D4 of command generator circuit 56.

Figure 6:
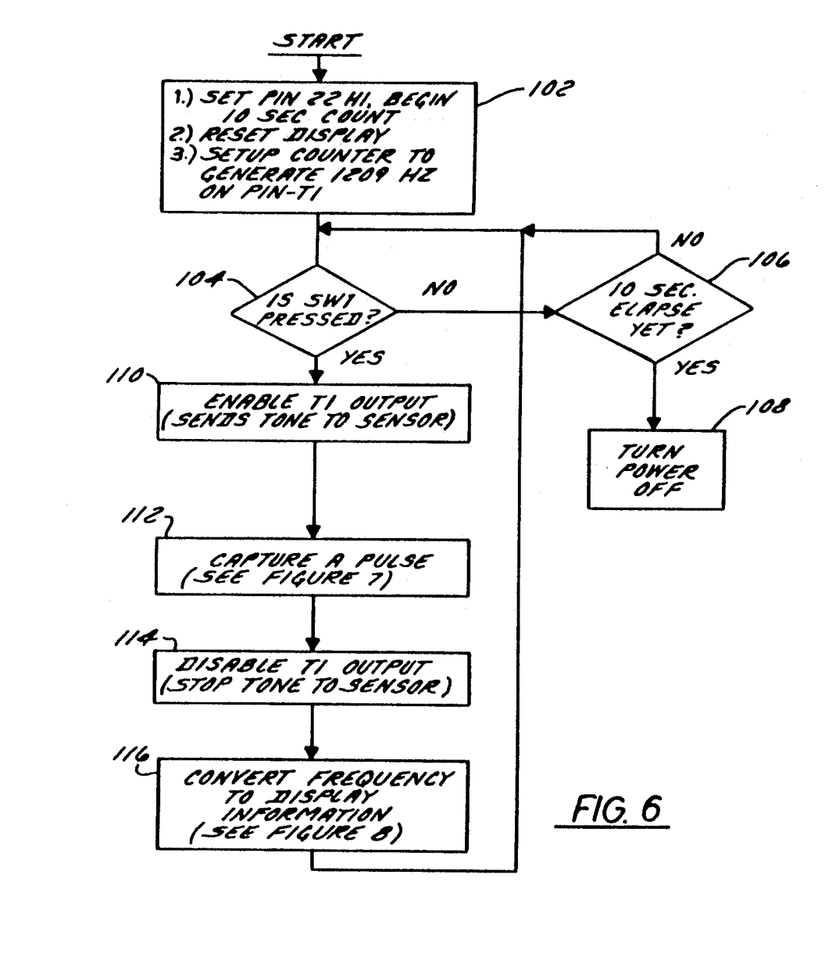
FIGS. 6-8 are flow charts of the operation of an exemplary tire pressure sensor system.

Each time switch S1 is depressed, the sequence depicted in FIG. 6 is reset, and processor U3 begins executing at the START position. For clarity, it is presumed that switch S1 is initially depressed once.

When it is desired to display the tire pressure sensed by transducer unit 14, the operator depresses switch S1 on hand-held display unit 12. As a result, power is applied to pin 22 of processor U3, and the voltage level at pin 21 is driven low, indicating that switch S1 is depressed.

After initialization, the state of switch S1 is checked (step 104) to determine if switch S1 is depressed. If the voltage level at pin 21 is low, it is determined that switch S1 is depressed; if an open circuit is detected at pin 21, it is determined that switch S1 is not depressed.

If processor U3 determines that switch S1 is depressed, the output at pin 39 is enabled, thereby applying the command reference signal to command generator circuit 56 and transmitting command signal CS to transducer circuit 52 (step 110).

If in step 104 it is determined that switch S1 is not depressed, a predetermined delay period of, for example, ten seconds, is elapsed (step 106). If after 10 seconds switch S1 is not depressed a second time, battery 41 is turned off (step 108). Thus, when the operator requires a "read" by closing switch S1, processor U3 executes the resident software and display unit 12 displays tire pressure for ten seconds, as described below. If switch S1 is pressed again before ten seconds have elapsed, the sequence is interrupted and restarted at START to allow the operator to quickly monitor successive tires without having to undergo a ten second delay between readings. Moreover, battery 41 is automatically turned off ten seconds after the last depression of switch S1.

As discussed above in connection with FIG. 5, transducer circuit 14 emits response signal RS, having a modulation frequency indicative of tire pressure, upon receipt of command signal CS. Response signal RS is captured at pin 1 of processor U3 (step 112). Step 112 will be explained in greater detail in connection with FIG. 7.

Upon capturing response signal RS from transducer unit 14, command signal CS generated at command generator 56 is terminated, i.e., the output at pin 39 of processor U3 is interrupted (step 114), and the frequency of response signal RS is determined and converted by processor U3 to respective first, second and third 4-bit binary signals, as discussed above in connection with FIG. 3A (step 116).

Figure 7:
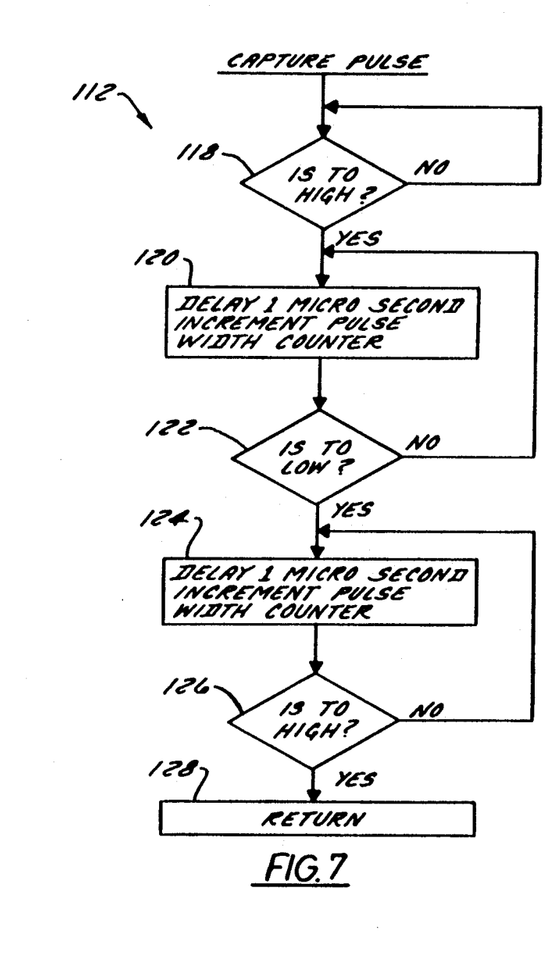
Figure 8:
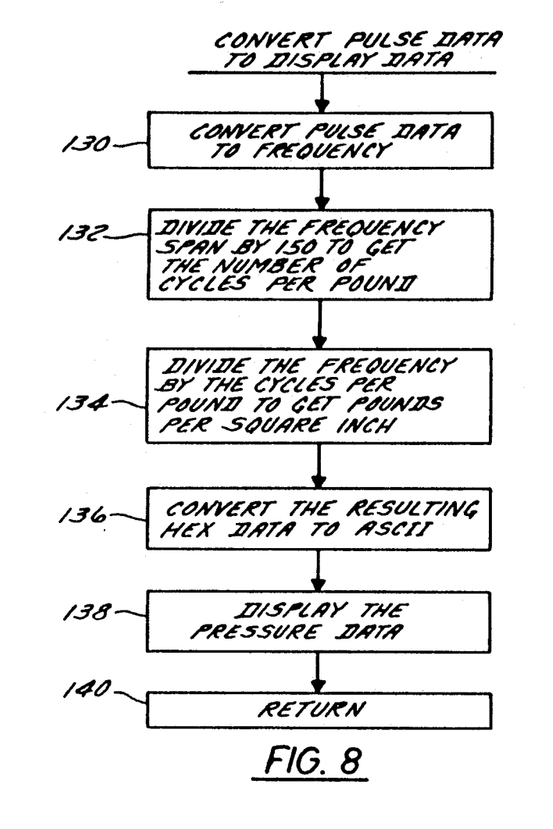

More specifically, with reference to FIG. 7, processor U3 monitors pin 1 to determine if the output T0 (the conditioned response signal RS) from amplifier circuit 58 exhibits a high or low logic level. If output T0 is low, processor U3 waits for a high logic level (step 118).

When output T0 goes high, indicating that the peak portion of response signal RS is present at transistor Q1, a pulse width counter resident in processor U3 is incremented and a 1 micro-second delay is triggered (step 120). Processor U3 then checks to see if output T0 is still high (step 122). Steps 120 and 122 are repeated for as long as output T0 remains high. In this way, the duration of the peak portion of response signal RS is reflected in (is equal to) the number of increments of the pulse width counter, in micro-seconds (step 120).

When output T0 goes low, the pulse width counter is again incremented and another micro-second delay is triggered (step 124). Processor U3 then checks if output T0 is still low (step 126). Steps 124 and 126 are repeated until output T0 again assumes a high logic state, whereupon processor U3 terminates steps 112 and proceeds to step 114. Thus, upon completion of steps 118-126, the counter in processor U3 contains a count representative of the duration of one cycle of the response signal tone, i.e., the period T of one cycle, in microseconds. The frequency f of response signal RS, then, is equal to 1/T.

After determining the frequency of the response signal, processor U3 converts the frequency to display information (step 116). More specifically, the period count in the designated counter in processor U3 is inverted to yield the frequency f of response signal RS.

The frequency data is then converted into a form suitable for driving display circuit 46. The frequency data is within a predetermined range (span) of frequencies having a low frequency limit and a high frequency limit selected by the designer. More specifically, the low frequency value corresponds to the lowest pressure value in connection with which the tire pressure sensor apparatus will be used.

In the preferred exemplary embodiment, the low pressure value of the frequency is zero, corresponding to atmospheric pressure. This allows pressure transducer 60 to be calibrated with respect to voltage-to-frequency converter 62 in a convenient manner.

The high frequency end of the frequency span should be selected to correspond to the maximum pressure for which the device will be used. As is known in the art, conventional automobile tires require a maximum pressure in the range of approximately 35 to 65 psi. If the tire pressure sensor circuit is to be used in connection with automobile tires only, a suitable high limit for the frequency span may correspond approximately 65 to 70 psi. However, in larger tires of the type used on semi-tractor trailors, a maximum pressure of approximately 150 psi is desirable. Thus, if the tire pressure sensor apparatus is to be employed in the trucking industry, the upper limit of the frequency span preferably corresponds to approximately 150 psi.

The desired frequency span is accordingly divided by the desired operating range, for example, 150, to determine the number of cycles per pound (cpp) (step 132).

The frequency (f) determined in step 130 is then divided by the cycles per pound (CPP) determined in step 132 to yield the pressure in psi (step 134):

$$f/cpp = psi.$$

The psi data determined in step 134 is then converted to ASCII data, for example, through well-known hardware and software capable of performing BCD-to-7-segment or hexi-decimal-to-7-segment functions (step 136) and applied to display circuit 46 to generate visual indicia of the tire pressure (step 138). Processor U3 then returns to step 104 to await the next request for a pressure reading (step 140). If no request is made after ten seconds, battery 41 is shut down and display unit 12 enters the dormant state until switch S1 is depressed.

As previously noted, transducer unit 12 is advantageously disposed within a cap 24A for valve stem 24 of tire 18.

Valve stem 24 suitably comprises a generally cylindrical stem portion 150 having an internal bore 152 extending therethrough. The proximal portion (not shown) of bore 152 is disposed to communicate with the pressurized tire cavity The distal portion of bore 152, shown in FIG. 9, typically comprises an internal threaded portion 154 and an external threaded portion 156.

Valve stem 150 further comprises a plunger 158 seated within a valve assembly 160. Valve assembly 160 suitably comprises external threads 162 which threadedly engage internal threads 154 of valve stem 150.

Plunger 158 is connected with a piston (not shown), the underside of which is exposed to the internal tire pressure. The internal tire pressure exerts a force on the piston, urging plunger 158 upwardly in FIG. 9. Furthermore, the piston creates an air-tight seal within valve assembly 160, thereby maintaining the pressure within the tire. When it is desired to release pressure from the tire or, alternatively, to add additional air to the tire, plunger 158 is urged downwardly to establish communication between the internal tire cavity and the distal portion of bore 152.

Conventional valves typically include a valve cap having internal threads for threadedly engaging external threads 156 of valve stem 150. When it is desired to increase or decrease tire pressure, the cap is removed and plunger 158 is urged downwardly.

The conventional valve cap is replaced with a valve cap 24A which, like a conventional cap, has internal threads 166 which threadedly engage external threads 156 of valve stem 150. Valve cap 24A suitably houses transducer circuit, as discussed in greater detail below. Cap 24A is configured to resemble a conventional valve stem cap to reduce the risk of tampering and theft.

Cap 24A suitably comprises an infra-red (IR) unit 168 corresponding to photo-sensitive transistor Q5 and LEDs D5–D7 of transducer unit 14; a battery housing 170 containing battery 40; a housing 172, within which electronic circuitry for selectively converting tire pressure to a response signal, e.g., corresponding to elements 62, 64, 68 and 60, is disposed; a spring 174; and a plunger 176.

Plunger 176, suitably secured to circuit housing 172, is configured to depress valve plunger 158 when cap 24A is secured to valve stem 150. In this way, internal tire pressure is released into the inside of cap 24A when cap 24A engages valve stem 150. As cap 24A is removed from valve stem 150, for example when it is desired to increase or decrease tire pressure, plunger 176 is backed off plunger 158, thereby permitting valve assembly 160 to seal off the internal tire pressure.

Spring 174 prevents mechanical and, hence, electrical contact between battery housing 170 and circuit housing 172 when cap 24A is not secured to valve stem 150. As cap 24A is threadedly secured to stem 150, plunger 158 urges plunger 176 toward battery housing 170, overcoming the force exerted by spring 174 and establishing electrical contact between housing 172 and battery 40. In this way, battery 40 may be conserved until cap 24A is placed on stem 150.

Pressure transducer 60 (not shown in FIG. 9) is suitably housed within housing 172. Signal conversion circuitry, such as that described in connection with signal convertor 34 (FIG. 2A), is also housed within housing 172. Similarly, the transmitter and transmitter driver components, analogous to LED 38 and LED driver 36 of FIG. 2A, may be housed within housing 172. Alternatively, IR unit 168 may perform the dual function of receiving a command signal and transmitting a response signal, in which case sensor 168 may also comprise an appropriate LED (not shown). In yet a further alternate embodiment, the response generator (LED and driver) may be disposed proximate an opening which entends through the side of cap 124 proximate housing 172.

Those skilled in the art will appreciate that housing 172 may comprise a signal generator which produces a response signal through a medium other than infra-red. Infra-red is highly preferred because it does not require FCC licensing as is the case with many frequencies in the radio band. IR frequencies are also desirable in that use thereof reduces the likelihood of interference with other electromagnetic sources typically found in an automotive environment, for example, sunlight, garage door openers, radar detectors, and the like.

Those skilled in the art will also appreciate that, to the extent economically feasible, the electronic circuitry may be implemented in a micro-chip configured for disposition within housing 172. Mass production of such a chip could result in a per unit cost for each transducer circuit which is relatively insignificant with respect to the cost of a tire. When the battery output becomes too low to generate a satisfactory response signal, the cap may be disgarded and replaced with one having a new battery.

It will be understood that while the various conductors/connectors may be depicted in the drawings as single lines, they are not shown in a limiting sense and may comprise plural connectors/connectors as understood in the art. Further, the above description is of preferred exemplary embodiments of the present invention; the invention is not limited to the specific forms shown. For example, while the transducer unit has been described as being mounted within the valve stem, valve stem cap, or tire tread, it is understood that the actual transducer may be mounted anywhere tire pressure may be sensed. In addition, the transducer circuit need not have an independent power source; rather, power may be delivered from the transmittor unit to the transducer unit, as desired. These and other modifications may be made in the design and arrangement of the elements discussed herein without departing from the scope of the invention as expressed in the appended claims.

I claim:

1. A tire pressure display device, comprising:
    a sensor unit including:
        transducer means for sensing tire pressure and generating a first electrical signal indicative thereof; and
        first signal processing means, responsive to said first electrical signal, for generating a second electrical signal to a response generator including an LED driver circuit and at least one LED driven thereby, said response generator being configured to transmit a response signal, in the infrared frequency range, indicative of tire pressure; and
    a remote display unit including:
        means for receiving said response signal and generating a third electrical signal;
        second signal processing means, responsive to said third electrical signal, for generating a display signal; and
        display means, responsive to said display signal, for generating indicia of the pressure within the tire.

2. The device of claim 1, wherein:
    said display unit further comprises command means for generating a command signal;
    said sensor unit further comprises command receptor means for capturing said command signal; and
    said sensor unit is configured to assume a dormant state in the absence of receipt of said command signal and an active state in response to the receipt of said command signal by said receptor means.

3. The device of claim 2, wherein said command means comprises at least one command LED such that said command signal comprises an infrared command signal, and wherein said command receptor means comprises a photo-sensitive transistor for receiving said infrared command signal.

4. The device of claim 1, wherein said sensor unit further comprises a power source, electrically connected to said first signal processing means, for supplying power thereto.

5. The device of claim 4, wherein said power source is configured to selectively apply power to said LED driver circuit in accordance with said second electrical signal.

6. The device of claim 1, wherein said remote display unit further comprises a second power source, electrically connected to said second signal processing means, for supplying power thereto.

7. The device of claim 1, wherein said LED driver is configured to transmit an infrared signal at a frequency corresponding to said pressure within said tire.

8. A method of measuring tire pressure, comprising the steps of:
    sensing the internal pressure within the tire and generating a first electrical signal indicative thereof;
    encoding said first electrical signal;
    applying said encoded first electrical signal to a response generator including at least one LED configured to emit a second electrical signal in the infrared frequency range;
    transmitting said second electrical signal, indicative of said encoded first electrical signal, from said response generator to a remote display unit; and
    capturing said transmitted second electrical signal and generating visual indicia representative of tire pressure.

9. The method of claim 8, wherein said encoding step comprises encoding said first electrical signal into a first digital signal indicative of said internal pressure within said tire.

10. A remotely actuatable device for determining a physical parameter associated with a workpiece, comprising:
    a transmitter unit, including:
        transducer means for sensing a physical parameter associated with a workpiece and for generating a first electrical signal representative of said parameter;
        first computing means responsive to said first electrical signal, for generating a second electrical signal having a characteristic representative of said first electrical signal; and
        first signal generating means, responsive to said second electrical signal, for transmitting a third electrical signal to a portable, hand-held receiver unit;
    said receiver unit comprising:
    receptor means for receiving said third electrical signal from said transmitter unit and generating a fourth electrical signal representative thereof;
    second computing means, responsive to said fourth electrical signal, for generating a driver signal; and
    display means, responsive to said driver signal, for generating indicia indicative of said parameter;
    wherein said first computing means comprises a first microprocessor;
    said first signal generating means comprises at least one LED;
    said third electrical signal comprises an infrared signal; and
    said receptor means comprises a photo-sensitive transistor for receiving said infrared signal.

* * * * *